United States Patent [19]

Topor

[11] Patent Number: 5,745,391

[45] Date of Patent: Apr. 28, 1998

[54] APPARATUS FOR AND METHOD OF TURNING ON AND SHUTTING OFF A COMPUTING DEVICE

[76] Inventor: Yakov Topor, 21 Yonitzman Street, Tel Aviv, Israel

[21] Appl. No.: 527,617

[22] Filed: Sep. 13, 1995

[51] Int. Cl.$^6$ ............................ G06F 1/00; G06F 1/18; G06F 1/26

[52] U.S. Cl. ............... 364/707; 395/182.13; 395/182.2; 395/182.21; 395/182.22; 395/750

[58] Field of Search ........................... 364/707; 395/575, 395/750, 182.13, 182.2, 182.21, 182.22

[56] References Cited

U.S. PATENT DOCUMENTS

| | | | |
|---|---|---|---|
| 4,907,150 | 3/1990 | Arroyo et al. | 395/182.22 |
| 5,021,983 | 6/1991 | Nguyen et al. | 364/707 |
| 5,379,435 | 1/1995 | Hanaoka | 395/750 |
| 5,386,552 | 1/1995 | Garney | 395/575 |
| 5,410,713 | 4/1995 | Whit et al. | 395/750 |
| 5,471,624 | 11/1995 | Enoki et al. | 395/750 |

*Primary Examiner*—Reba I. Elmore
*Assistant Examiner*—Emmanuel L. Moise
*Attorney, Agent, or Firm*—Mark M. Friedman

[57] ABSTRACT

An apparatus for and method of turning a computer on and off. A switch accepts on and off commands from a user which are transmitted to latch circuitry which, in turn, controls relay control circuitry. Relay control circuitry opens or closed a relay in response to the switch input. Issuance of an off command causes the computer to save its internal memory contents to nonvolatile memory storage. After the internal state of the computer is saved, the relay opens and cuts off electrical power to the computer, forcing it off. Issuance of an on command causes power to be restored to the computer and the internal state of the computer is restored from non-volatile memory to the computer. Alternatively, on and off commands may be received by latch circuitry from a remotely located central controller. Commands travel across a network and are received by network interface circuitry.

6 Claims, 2 Drawing Sheets

APPARATUS FOR AND METHOD OF TURNING ON AND SHUTTING OFF A COMPUTING DEVICE

FIELD AND BACKGROUND OF THE INVENTION

The present invention relates to an apparatus for and method of turning on and shutting off a computing device.

Today, it is evident that the personal computer is playing a more and more significant role in most peoples lives. A large percentage of the population already own at least one computer and many have more than one. A large portion of these computer users typically turn their machines off when they are not being used. Each time a user turns their computer on, they must wait while the computer goes though internal system checks, system software is loaded, startup files are executed, application programs are launched, etc. This can take significant time in most cases. Moreover, if a user is running Windows software, an additional layer of software (i.e. the graphical user interface or GUI) must be loaded and executed before any applications may be executed. Currently, Windows software is large, consuming many tens of megabytes and future versions are most likely to expand in size rather than shrink. Loading Windows takes considerable time especially on older computers which typically have slower processors. In addition, Windows can be programmed to automatically startup any number of applications upon startup. Depending on the nature of the applications to be launched upon Windows starting up, the time to completely launch all desired applications can be significantly long, much more than the time to launch Windows itself.

If a computer user turns the computer on and off on a regular basis, rather than constantly keeping it on, the cumulative time spent waiting for system and application software to load and execute can be very large. In addition, the process of turning off a computer can be very time consuming, especially in Windows or other graphical user environments. It takes time for applications within Windows, for example, to shut down their processes and exit. Also, some time is needed for Windows itself to shut down its processes and exit to the underlying operating system. Thus, there is long felt need for a system that can save and restore the internal state of a computing device to and from non-volatile memory in a fraction of the time it would take conventionally (i.e waiting for systems and application software to load and execute and, later on, to shutdown).

SUMMARY OF THE INVENTION

The present invention provides an apparatus for and a method of turning on and shutting down a computing device. When a user desires to turn the computer off, the internal contents of the computer are saved before electrical power to the computer is shut off. When a user desires to turn the computer on, electrical power is applied to the computer followed by a restoration of the internal contents of the computer. The computer is left in the exact state it was in when the computer was last turned off.

Hence, there is provided according to the teachings of the present invention, a method of turning on and shutting down a computing device, comprising the steps of: providing for the receipt of on and off commands for toggling the computing device between an on state and on off state, respectively, providing non-volatile memory storage for retaining the internal state of the computing device while the computing device is in the off state, sensing receipt of an off command, storing the current internal state of the computing device in the non-volatile memory whereby the exact state of the computing device, at the time said off command was issued, may be restored at a later time, disconnecting electrical power from the computing device whereby the computing device is put into the off state, and sensing receipt of an on command, providing electrical power to the computing device whereby the computing device is put into the on state, restoring the previous internal state of the computing device from the non-volatile memory whereby the computing device is restored to the exact state it was in at the time the most recently issued off command was sensed.

While the invention has been described with respect to a limited number of embodiments, it will be appreciated that many variations, modifications and other applications of the invention may be made.

BRIEF DESCRIPTION OF THE DRAWINGS

The invention is herein described, by way of example only, with reference to the accompanying drawings, wherein.

DESCRIPTION OF THE PREFERRED EMBODIMENT

The present invention is of an apparatus for and a method for saving and restoring the internal state of a computing device to and from a non-volatile memory.

The principles and operation of the present invention may be better understood with reference to the drawings and the accompanying description.

Figure 1:
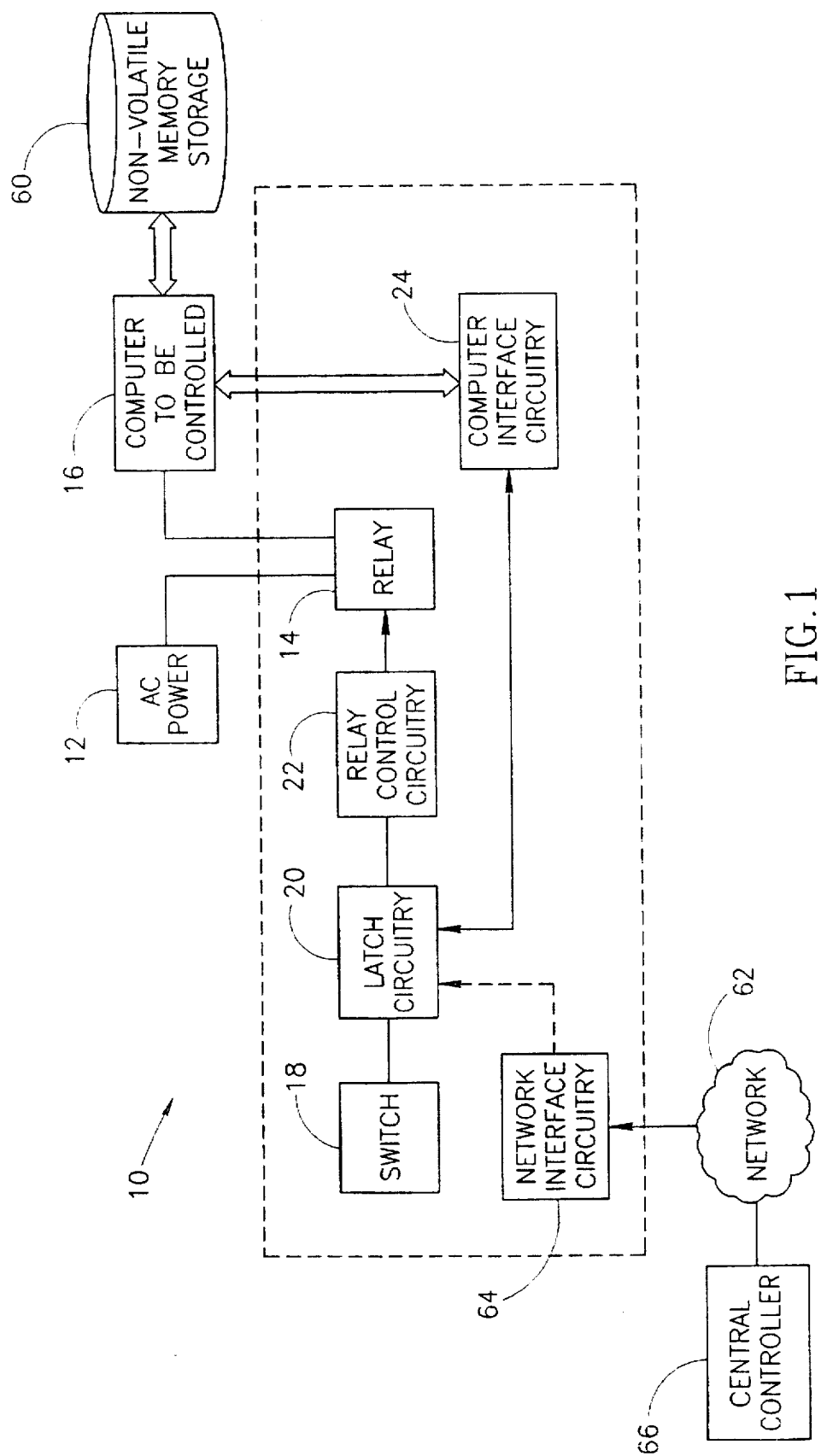
FIG. 1 is a functional block diagram of a preferred embodiment of the present invention.

The present invention describes a device 10, shown in FIG. 1, for turning a computing device, such as a personal computer, on and off. Device 10 is connected to a source of alternating current (AC) power 12. An electrical relay 14 is coupled to AC power 12. Relay 14 can be any electrical or electro-mechanical component for controlling the flow of electrical current, such as electro-mechanical relays, semiconductor switches, etc. Relay 14 is coupled to a computer 16 that is to be turned on and off by device 10. Computer 16 can be any type of computer, personal or other type, such as IBM or IBM compatible computers that are in widespread use today. Coupled to computer 16 is non-volatile memory storage 60. Non-volatile memory storage 60 can be integral with computer 16, meaning a portion of the long term memory storage (i.e. hard disk drive, floppy disk drive, non-volatile semiconductor memory, etc.) inside computer 16 is used to store non-volatile data. Hard disk drives are by default non-volatile because they do not lose information written to them when electrical power is removed. Alternatively, non-volatile memory storage 60 can be an external device containing non-volatile memory storage such as an external disk drive (i.e. floppy or hard disk), semiconductor non-volatile random access memory (NVRAM), magnetic memory (i.e. bubble memory), etc.

Commands to turn computer 16 on and off are received by a switch 18. In a preferred embodiment, switch 18 is an electrical or mechanical switch. A user presses switch 18 to turn computer 16 on and off. Switch 18 can be a pushbutton type switch, wherein a toggle function is performed, meaning each subsequent press of switch 18 causes the state of electrical power flow to computer 16 to off if it was previously on and on if it was previously off. Alternatively, switch 18 can be a single pole switch, having an 'on' and an 'off' position.

In a preferred embodiment, switch 18 is incorporated in a conventional keyboard. However, switch 18 can alternatively be incorporated into other components, such as, a mouse, video monitor housing or the computing device itself. Additionally, a separate external unit may house switch 18 and additional portions of device 10.

In a preferred embodiment, network interface circuitry 64 receives 'on' and 'off' commands from over a network from a central controller 66. Central controller 66 may reside on the same local area network (LAN) as device 10 or may be located in a remote location. If central controller 66 is located at a remote location, network 62 might include the telephone network connected to a LAN or may include a wide area network (WAN) covering a large geographical area. Network interface circuitry 64 includes means for receiving and interpreting on and off commands received over network 62 which originate from central controller 66. Central controller 66 alternatively can be any device that can generate 'on' and 'off' commands. Such devices may include active or passive infrared sensors or detectors (PIR), ultraviolet (UV) detectors, smoke detectors, noise detectors, power failure sensors (i.e. uninterruptable power supplies (UPS)), etc.

Latching circuitry 20 is coupled to switch 18 and receives the on and off commands as output by switch 18. In a preferred embodiment latch circuitry 20 may receive 'on' and 'off' commands from network interface circuitry 64 and/or from switch 18. Latch circuitry 20 is coupled to relay control circuitry 22. Relay control circuitry 22 functions to accept open and close commands from latch circuitry 20 and subsequently put relay 14 in an either open or closed state. When relay 14 is put into the open state, electrical power is cutoff from the computing device 16. When relay 14 is put into the closed state, electrical power is allowed to flow to the computing device.

Computer interface circuitry 24 is coupled to latch circuitry 20 and computer 16. Computer 16 is suitably programmed to be able to send and receive data between computer 16 and computer interface circuitry 24. Coupled to computer 16 is non-volatile memory storage (NV memory) 60. NV memory 60 may be either integral with computer 16, being situated internally, or NV memory 60 may be located externally to computer 16. In a preferred embodiment, NV memory storage 60 is located internally to computer 16. In both embodiments, computer 16 includes means for saving the internal state of computer 16 to NV memory 60. In addition, computer 16 includes means for restoring the internal state of computer 16 from NV memory 60 to computer 16.

A description of the operation of device 10, assuming computer 16 was previously in an off state, will now be given. A user wishing to turn computer 16 on, presses switch 18 or, alternatively, an 'on' command is issued from remote central controller 66 over network 62. Switch 18 or network interface circuitry 64 transmits the 'on' request to latch circuitry 20. Latch circuitry 20 retains the previous state of computer 16 that existed before the receipt of the most recent command. If computer 16 was previously off, the 'on' command is subsequently retained in latch circuitry 20. If computer 16 was previously on, the 'on' command is ignored. Similarly, if computer 16 was previously on, the off command is retained in latch circuitry 20. If computer 16 was previously off, the 'off' command is ignored.

At this point, an 'on' command has been transmitted through switch 18 or network interface circuitry 64 and has been received by latch circuitry 20. Latch circuitry 20 subsequently issues a close command to relay control circuitry 22. Relay control circuitry 22 closed relay 14, allowing electrical power to flow from AC power 12 through relay 14 to computer 16.

Figure 2:
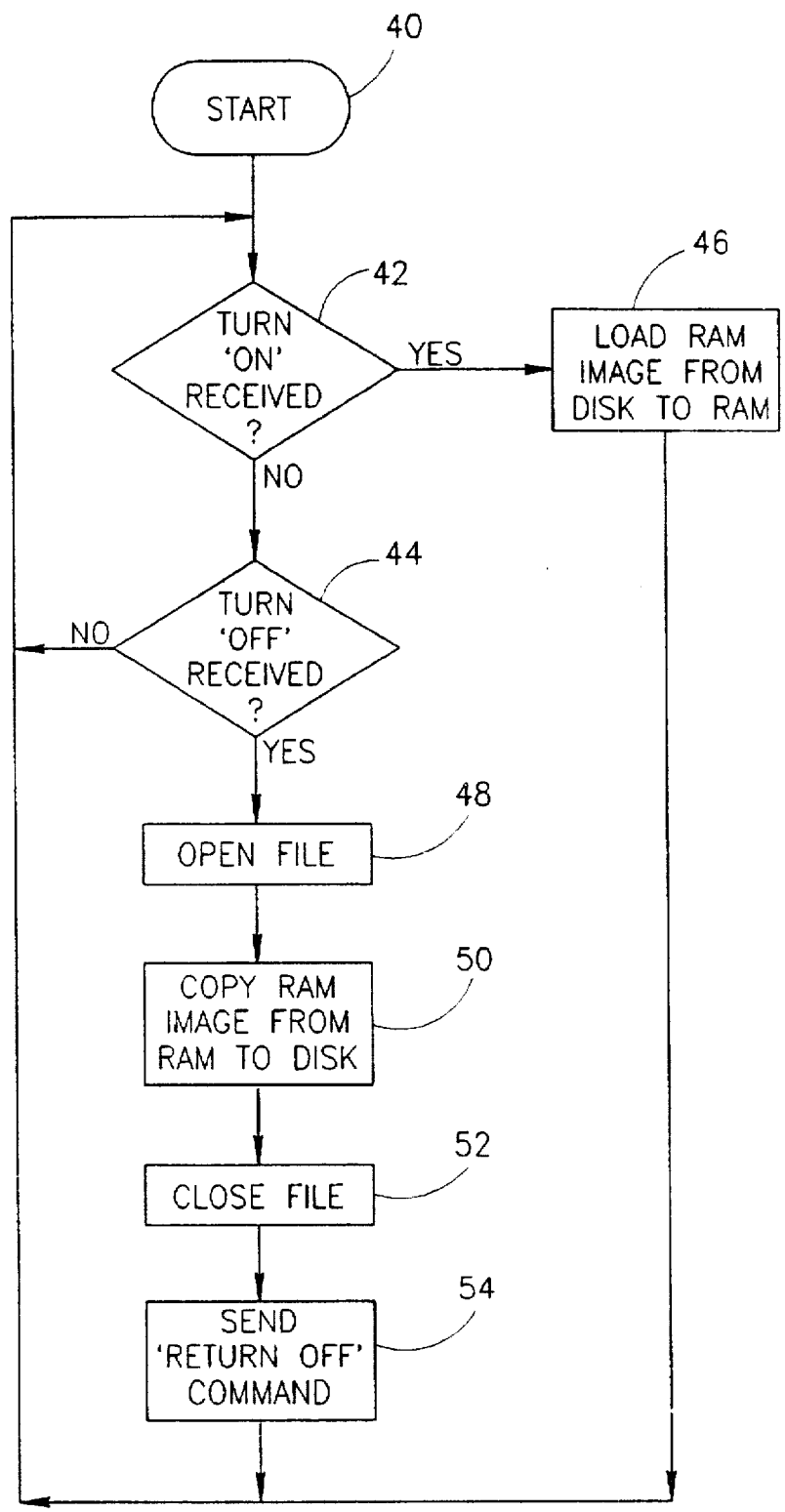
FIG. 2 is a high level flow diagram illustrating the control flow of a preferred embodiment of the present invention.

Computer 16 is suitably programmed to be able to perform the functions shown in FIG. 2. After electrical power is applied to computer 16, an internal power on reset boot program is typical executed on most personal computers. The boot program is usually placed in onboard firmware and is integral with computer 16. After the bootup program finishes executing, software installed on computer 16 checks to see if device 10 received an 'on' command. The contents of latch circuitry 20 is transmitted to computer 16 through computer i0nterface circuitry 24. Thus, computer 16 always knows the state of device 10 by utilizing computer interface circuitry 24. Once latch circuitry 20 has stored the 'on' command, computer 16 can detect that device 10 has received an 'on' command, as shown in decision block 42. Subsequently, the previously stored internal state of computer 16 is restored from NV memory 60 to computer 16 internal RAM, as shown in step 46. The internal state that is restored is a complete image of internal memory (i.e. RAM) as it existed at the time the previous 'off' command was received by device 10. The ability to restore the contents of internal memory greatly reduces the time spent loading operating system (OS) software, graphical user interface (GUI) software (i.e. Windows) and application software. Computer 16 is restored to exactly the state it was previously in at the time is was previously turned off, thus, saving the user a potentially large amount of time. Device 10 eliminates the need to spend time waiting for OS software, GUI and application software to load and execute because they are 'loaded' simultaneously when the internal memory image is restored from NV memory 60. In addition, a user can stop work at any time and shut down her/his computer without first exiting each application.

A description of the operation of device 10, assuming computer 16 was previously in an 'on' state, will now be given. A user wishing to turn computer 16 off, presses switch 18 or, alternatively, an 'off' command is issued from remote central controller 66 over network 62. Switch 18 or network interface circuitry 64 transmits the 'off' request to latch circuitry 20. If the current contents of latch circuitry 20 is an 'on' state that the 'on' state is replaced by the 'off' state. The new 'off' state is retained by latch circuitry 20.

Once an 'off' command is latched by latch circuitry 20, the 'off' command is transmitted to computer 16 by computer interface circuitry 24. Computer 16 includes means for saving the internal state of computer 16 to NV memory 60. The internal RAM image of computer 16 is saved to NV memory 60 as to allow computer 16 to continue to operate following a subsequent receipt of an 'on' command. As shown in FIG. 2, decision block 44 is true because computer interface circuitry 24 sends the contents of latch circuitry 20 to computer 16. First, computer 16 opens a file, as shown in step 48, which is to hold the RAM image. Then the internal RAM image is copied to NV memory 60, as shown in step 50. Subsequently, after the RAM image is copied, the file is closed, as shown in step 52. After the file is closed., a 'return off' command is sent by computer 16 to latch circuitry 20 through computer interface circuitry 24. The 'return off' command causes latch circuitry 20 to transmit a relay open command to relay control circuitry 22. Relay control circuitry 22 subsequently opens relay 14, cutting electrical power to computer 16, turning it off.

Thus, the time to turn on and off computer 16 is greatly reduced. Conventionally, turning computer 16 off involves shutting down and exiting each application and then exiting from the GUI, such as Windows. In addition, if the user was previously in the midst of working in a complex application, it would be very time consuming to return to the same point and continue working, the next time computer 16 was turned on. Device 10 provides an efficient mechanism to quickly stop working, turn off computer 16 and return as a later time and continue working, due to the ability of device 10 to completely restore computer 16 to the state it was previously in.

While the invention has been described with respect to a limited number of embodiments, it will be appreciated that many variations, modifications and other applications of the invention may be made.

What is claimed is:

1. An apparatus for turning on and shutting down a computing device, comprising:

a control switch separate from any power on/off switch constituent to the computing device, said control switch for receiving on and off commands for toggling the computing device between an on state and an off state;

latch circuitry electrically coupled to said control switch, said latch circuitry
   (a) for retaining whether the computing device is in said on state or said off state;
   (b) for sensing said control switch on and off commands; and,
   (c) for providing turn-on and turn-off commands to the computing device;

a relay controller, said relay controller electrically coupled to said latch circuitry for controlling the operation of a relay;

said relay electrically coupled to said relay controller and to a source of electrical current, said relay for controlling the flow of electrical current to the computing device;

non-volatile memory for storing the internal state of the computing device while the computing device is in said off state;

a saving program for
   saving the current internal state of the computing device to said non-volatile memory upon receipt by said control switch of said off command,
   said saving program for disconnecting electrical power from the computing device whereby the computing device is put into said off state;

a restoring program for
   providing electrical power to the computing device whereby the computing device is put into said on state,
   said restoring program for restoring the internal state of the computing device from said non-volatile memory, upon receipt by said control switch of said on command; and, computer interface circuitry for communication between said latch circuitry and said saving program and said restoring program.

2. The apparatus of claim 1, wherein said control switch includes an electrical switch.

3. The apparatus of claim 1, wherein said control switch includes network interface circuitry to receive said on and said off commands remotely from a remote central controller.

4. The apparatus of claim 1, wherein said non-volatile memory is integral with the computing device, meaning a portion of a long term memory storage inside the computing device is used to store non-volatile data.

5. The apparatus of claim 1, wherein said non-volatile memory is external to the computing device.

6. The apparatus of claim 1, wherein said non-volatile memory includes external non-volatile storage media.

* * * * *